United States Patent [19]
Zampini et al.

[11] Patent Number: 5,488,669
[45] Date of Patent: Jan. 30, 1996

[54] MANUAL CROSS FADE LEARN FEATURE FOR AN AUDIO FOLLOW VIDEO MIXER

[75] Inventors: Michael A. Zampini; Alan Flum, both of Boca Raton; Donald E. Davis, Margate; Joseph J. Dombrowski, Hollywood, all of Fla.

[73] Assignees: Sony Corporation, Tokyo, Japan; Sony Electronics Inc., Park Ridge, N.J.

[21] Appl. No.: 142,974

[22] Filed: Oct. 29, 1993

[51] Int. Cl.$^6$ .................................................. H04B 1/00
[52] U.S. Cl. ............................................. 381/119; 381/120
[58] Field of Search ............................ 381/119–120, 107, 381/123

[56] References Cited

U.S. PATENT DOCUMENTS

| | | | |
|---|---|---|---|
| 4,635,288 | 1/1987 | Stadius | 381/119 |
| 4,947,440 | 8/1990 | Bateman et al. | 381/119 |
| 5,060,272 | 10/1991 | Suzuki | 381/119 |
| 5,175,771 | 12/1992 | Zampini et al. | 381/119 |
| 5,230,024 | 7/1993 | Zampini et al. | 381/119 |
| 5,299,267 | 3/1994 | Nakamura | 381/119 |
| 5,317,641 | 5/1994 | Yasuda et al. | 381/119 |

OTHER PUBLICATIONS

Commonly owned co–pending application, Serial No. 08/135,351, filed on Oct. 13, 1993.
Commonly owned co–pending application, Serial No. 08/119,835, filed on Sep. 13, 1993.

*Primary Examiner*—Stephen Brinich
*Attorney, Agent, or Firm*—Ronald P. Kananen

[57] ABSTRACT

Disclosed is an audio follow video mixer incorporating a manual cross fade learn feature. According to the invention, an operator may set the mixer so that a crossfade operation performed manually is stored in memory. The stored crossfade operation can thereafter be recalled and performed in an AUTO mode and an EDITOR mode. Also disclosed are LED indicators to visually indicate the status of the mixer, including which channel is active.

11 Claims, 8 Drawing Sheets

MANUAL CROSS FADE LEARN FEATURE FOR AN AUDIO FOLLOW VIDEO MIXER

CROSS REFERENCE TO RELATED APPLICATIONS

Reference is made to the following commonly owned-co-pending applications: "VTR CONFIGURATION OF A MODULAR AUDIO FOLLOW VIDEO MIXER" (Attorney Docket No. SOA-037) Ser. No. 08/119,835 filed on Sept. 13, 1993; "UP AND DOWN-LOADABLE VTR CONFIGURATION FOR AN AUDIO FOLLOW VIDEO MIXER" (Attorney Docket No. SOA-035) Ser. No. 08/135,351 filed on Sept. 30, 1993.

FIELD OF THE INVENTION

This invention relates to editing of audio data using an audio follow video mixer system. More particularly, this invention relates to a cross fade learn feature for an audio follow video mixer.

BACKGROUND OF THE INVENTION

It is known that an audio mixer system may be advantageously used to edit several audio channels provided by several multi-channel devices such as video tape recorders (VTRs). In a typical configuration, several audio channels are input to an audio follow video mixer. The mixer can then be used to process the input audio channels according to various operations such as PREVIEW/REVIEW or FADE UP/FADE DOWN. Audio channels which are actively being processed may be monitored and output to other VTRs associated with the mixer.

In order to facilitate these various mixer operations, it has been found useful to provide several different operating modes for the mixer. For example, the mixer may be set to operate in an EDITOR mode in which an operator controls editor operations by use of video editor which provides various control signals to a mixer unit. In this mode, most of the mixer's local controls, which may be located on the mixer's console, will be disabled. The mixer may also be set to operate in AUTO mode wherein various functions are initiated by the operator locally using the mixer console but are performed automatically by the mixer according to preset operating routines.

In addition to these functions, a mixer may also be set for MANUAL mode operation. In this mode, the operator manually controls the various operations of the mixer using local controls located on the mixer console. For example, the operator may perform crossfades manually between selected audio channels. Manual control of the crossfade operation affords the operator the advantage of tailoring the manner in which the crossfade is performed, rather than being constrained to a particular preprogrammed crossfade.

However, prior art mixer systems in which crossfades are performed manually suffer the drawback that it is difficult for the operator to identically reproduce a particular crossfade operation. While an experienced operator may minimize this drawback by repeated practice, this requires additional time and expense in production.

There is therefore a need to provide a mixer which offers the flexibility afforded by manual operation along with ease in reproducing custom crossfades.

SUMMARY OF THE INVENTION

A general object of this invention is to meet this need and to overcome the aforementioned and other drawbacks of the prior art by providing an audio follow video mixer for performing a crossfade operation between a first audio channel having a first amplitude and a second audio channel having a second amplitude comprising: gain control means for adjusting the amplitude of the first audio channel and the second audio channel, said gain control means including means for manually controlling the adjustment of the amplitude of the first audio channel and the second audio channel and means for providing signals indicating the adjustment made to the first audio channel and the second audio channel; memory means for storing data corresponding to said signals; and mode select means for enabling the mixer to adjust the amplitudes of the first audio channel and the second audio channel according to said data stored in the memory means.

According to one aspect of the invention, the mode select means includes a central processing unit (CPU) operatively coupled to the memory means.

According to another aspect of the invention, the apparatus further includes a control member located on a display portion of the mixer for enabling said control signals from the gain control means to be stored by the memory means.

According to another aspect of the invention, the apparatus includes a LED indicator for visually indicating that the control member has enabled the storing of said data.

According to another aspect of the invention, the apparatus further includes a transition start member for providing a crossfade initiate signal to said CPU. According to this aspect of the invention, the CPU, upon receiving said crossfade initiate signal, initiates an adjustment of the amplitude of the first audio channel and the amplitude of the second audio channel according to adjustment indicating signals stored in the memory means.

Finally, according to another aspect of the invention, said manual adjustment control means includes a first member and a second member each respectively coupled to gain control circuit means which control the amplitude of the first and second audio channels.

BRIEF DESCRIPTION OF THE DRAWINGS

FIG. 3A-1 and 3A-2 are is a detailed view of an input module portion of a mixer console.

FIG. 3B-1 and 3B-2 are is a detailed view of a serial interface module portion of a mixer console.

DETAILED DESCRIPTION OF THE PREFERRED EMBODIMENT

Figure 1:
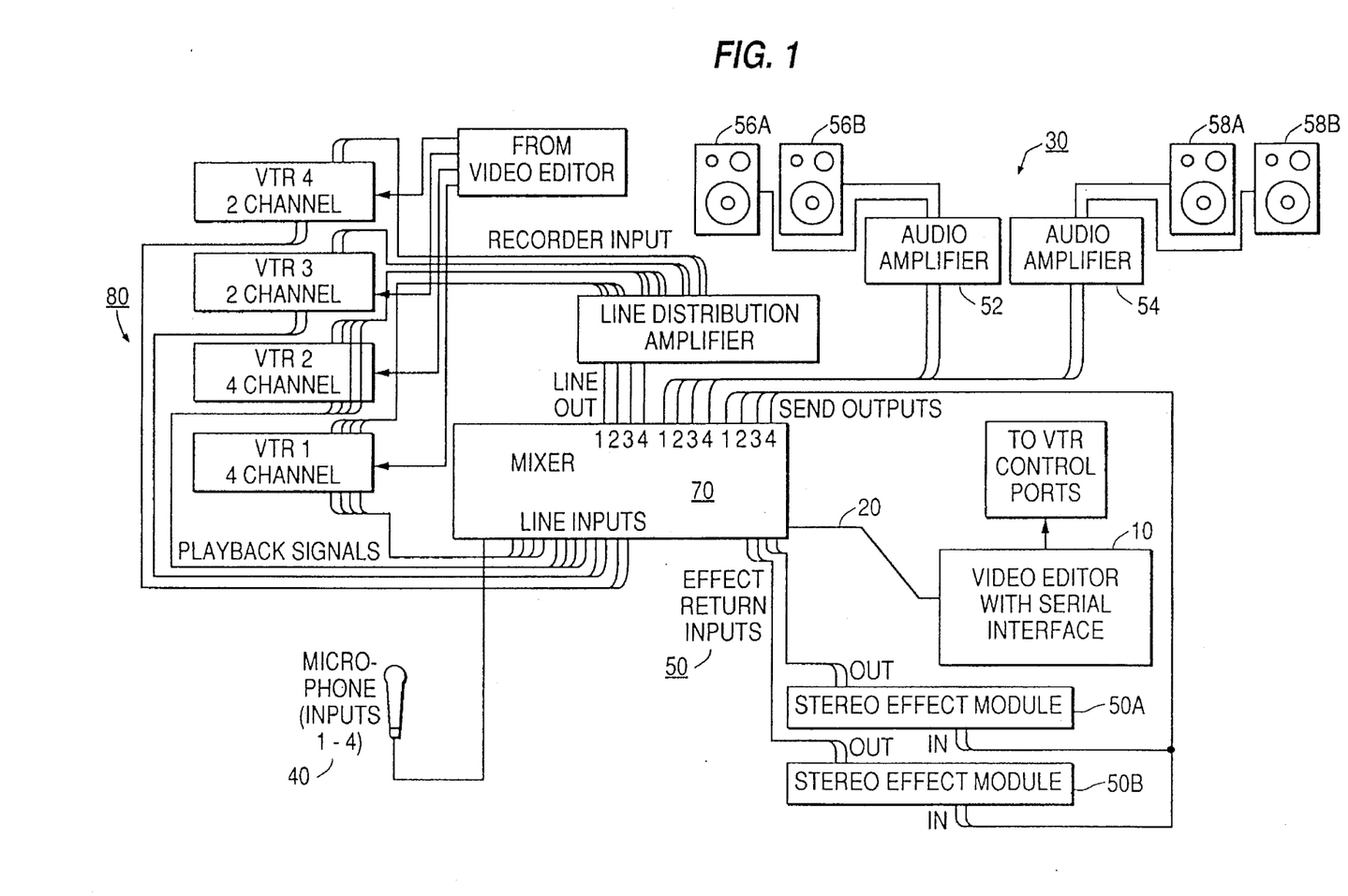
FIG. 1 is a representation of a typical mixer system according to the present invention.

FIG. 1 is a representation of a mixer system according to the present invention as used in a typical application. The system of FIG. 1 includes an editor 10 connected through a serial editor interface cable 20 to an audio follow video mixer 70. A plurality of multi-channel devices 80 are connected to the mixer 70 through several line input ports on the mixer. For convenience only, the following description will refer to VTRs, but it is to be understood that the invention is not so limited. Other devices, including other multi-channel devices, may be used with this invention.

As shown in FIG. 1, the editor 10 controls the operation of the audio follow video mixer 70 according to the signals from the video editor 10 supplied to a serial interface in the audio follow video mixer 70. The video editor 10 may also control the VTRs 80 through VTR control ports located on the VTRs. Peripheral devices, such as monitor devices 30 and effects modules 50A and 50B are provided to aid in mixing. In the example shown, the monitoring devices include two audio amplifiers 52 and 54 each associated respectively with a pair of audio speakers 56A and 56B, and 58A and 58B. With such a system, an operator of the video editor 10 may process several channels of input supplied to the mixer from different combinations of VTRs 80.

In such a system, the mixer is configured in such a way that each of the input audio channels from the VTRs are coupled to monitor and preview bus lines in the mixer. Once the system is configured, the operator may select two of the channels for editing. For example, a first channel A may be selected as an active channel to be faded out while a second inactive channel B may be selected to be faded in to full gain by use of a fader control member. The entire edit operation may be previewed in conjunction with monitoring devices 30.

Figure 2:
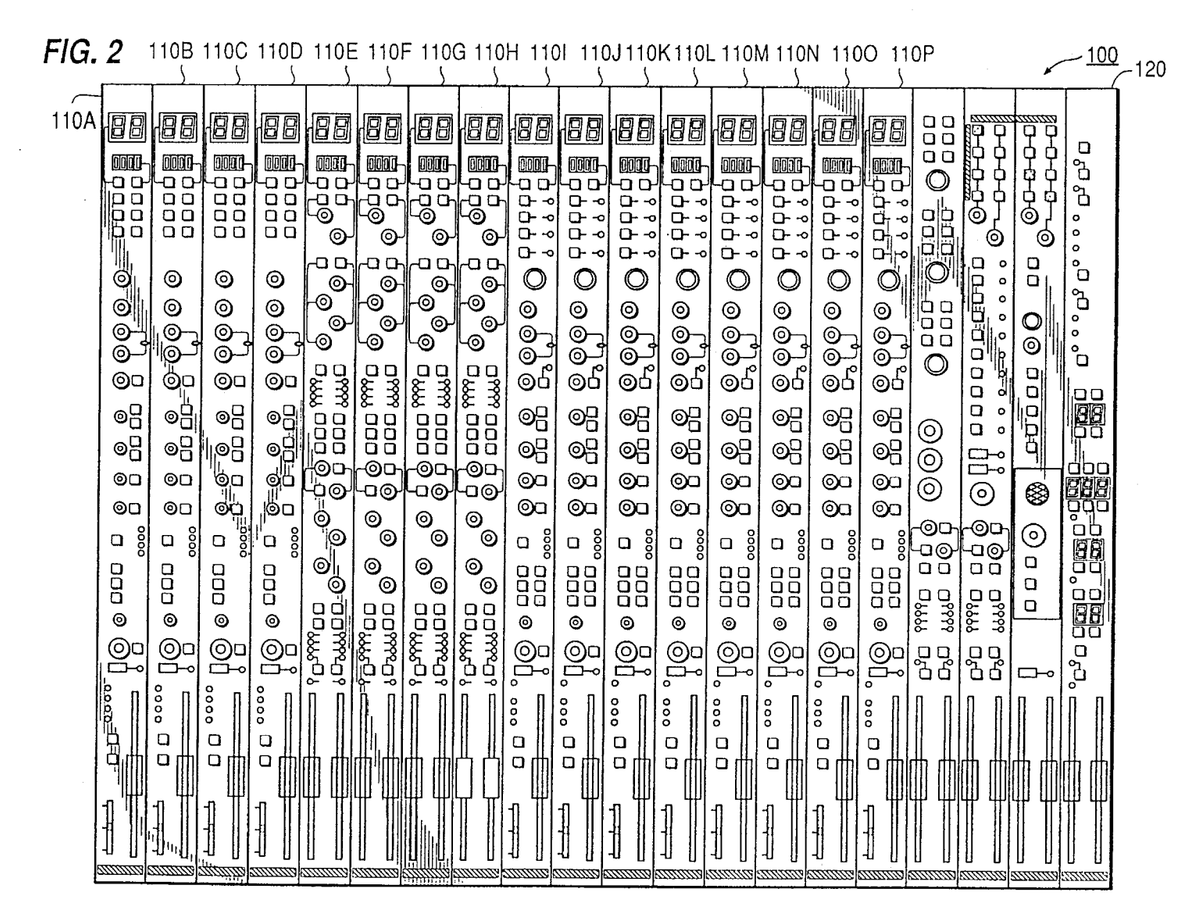
FIG. 2 is a front view of a mixer console according to an embodiment of the present invention.

FIG. 2 shows a front view of a mixer console 100 according to a preferred embodiment of the invention which may be employed in a mixer configuration such as described above. In the mixer 100 shown, sixteen input modules 110A, 110B, 110C, 110D, 110E, 110F, 110G, 110H, 110I, 110J, 110K, 110L, 110M, 110N, 110O and 110P are present in the mixer console 100. As illustrated, these input modules may be of several different types, for example, dual, stereo or monaural. Regardless of which type of module that is used, VTR selection may be performed similarly according to the present invention, as described below.

Also shown on the mixer console is a serial interface module 120. This module provides an interface between the mixer 100 and a video editor console, for example, as shown in FIG. 1. In combination with the input modules 110A through 110P, the serial interface module 120 allows a user to set a VTR configuration by uploading configuration information from a video editor to the serial interface. Alternatively, the configuration may be set at the input modules 110A through 110P, and configuration information provided to the video editor via the serial interface module 120.

In order to utilize the mixer console 100 to process the various input channels from several VTRs, it is necessary to configure each input module 110A through 110P so that it is associated with a particular VTR. For example, a first VTR, such as VTR 1 of FIG. 1, supplies a four channel input which may be supplied to any combination of monaural-, stereo- or dual-type modules in the audio follow video mixer. Once a particular input configuration has been selected, it is necessary to configure the input module receiving an input channel in accordance with the VTR supplying the input channel.

Figure 3A:
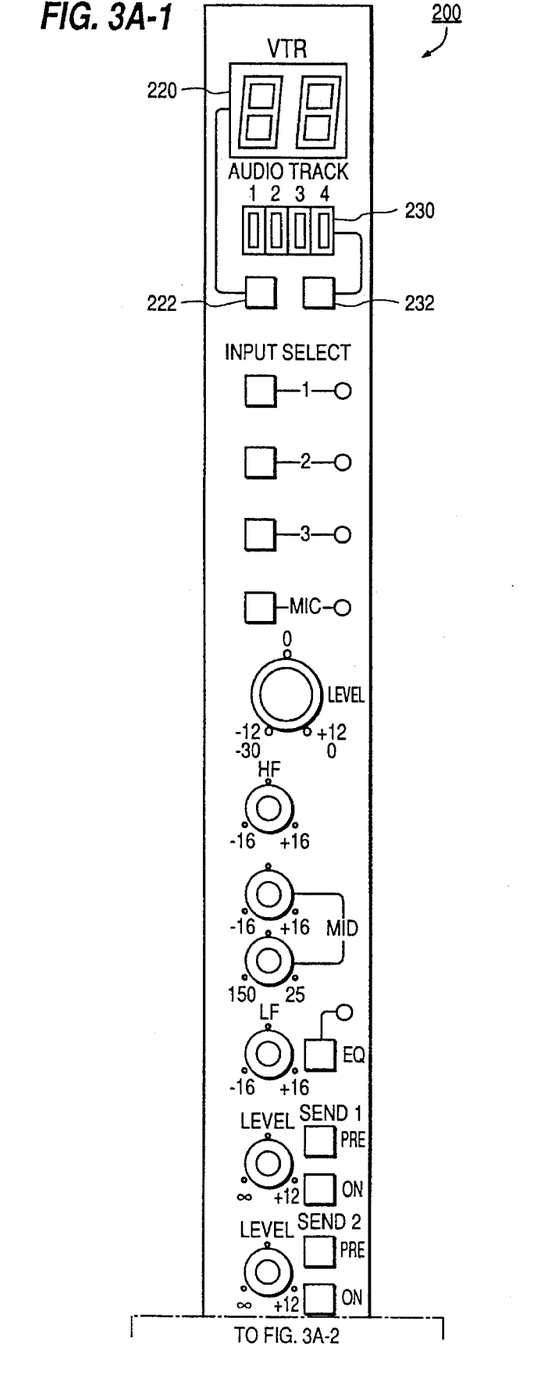
Figure 3A:
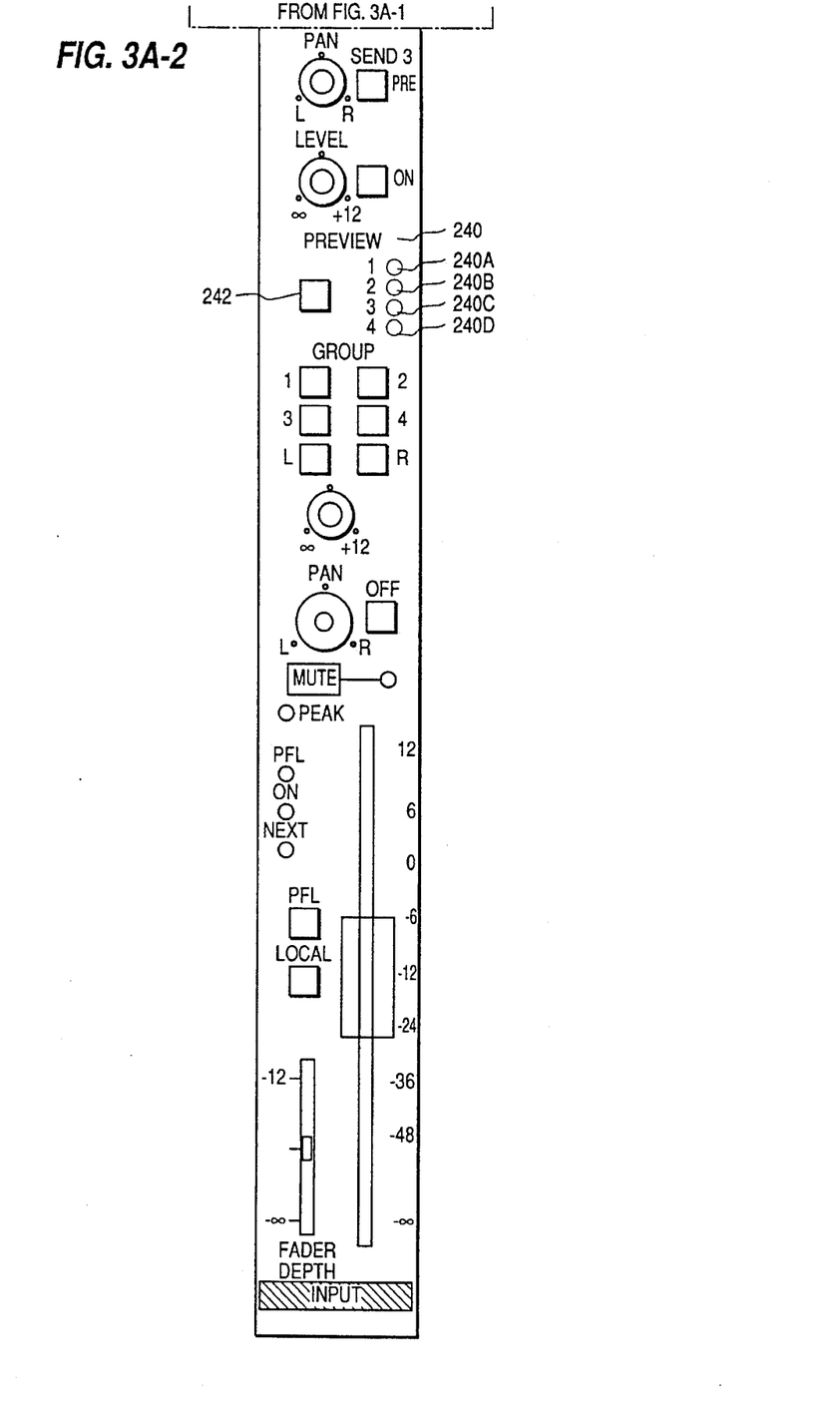

FIGS. 3A-1 and 3A-2 show a front view of an input module 200 by which the configuration of an audio follow video mixer may be set. In the example shown, a monaural-type module is illustrated. On the module console is a dual seven segment LED display 220 which displays the number of the VTR which has been selected. The VTR number is selected by pressing a machine select button 222 located below a four bar LED display 230. On initial power up, the VTR configuration display 220 will indicate the last assigned machine number. When the machine select button 222 is pressed, the display will increment to the next number. For example, the module 200 may be constructed to allow the numbers to increment from "RC" (record machine), then through numbers one through sixteen. However, the mixer input modules may be designed to utilize any number of VTRs. For example, instead of using sixteen VTR configuration numbers, thirty-two may be chosen.

Also shown in FIG. 3A-1 is a four segment bar LED 230. This display serves as a VTR audio assignment indicator for the mixer input module 200. This display shows which audio channel, from one to four, of the assigned VTR is assigned to the module. The audio channel of the VTR can be assigned to the mixer input module 200 by pressing the channel select button 232 located below the display 230. On initial power up, the display will indicate the last assigned channel. When the channel select button is pressed, the channel select indicator will increment to the next segment bar LED. The display will cycle through each of the bar segments which correspond to audio channels one to four.

Assigning the VTR audio track to the module in this way will also automatically assign the selected channel to the preview bus of the mixer. For example, if channel one is chosen, then the audio of the input module will be routed to a first preview bus. If channel two is chosen, then audio channel two will be routed to a second preview bus. A similar routing takes place for channels three and four. The preview bus to which a selected audio channel is assigned is displayed by an indicator display 240. In this example, this display includes four individual LEDs 240A, 240B, 240C and 240D, that indicate to which preview bus the selected audio channel is assigned. Each of the four LED indicators 240A, 240B, 240C, and 240D corresponds to a particular preview bus.

The preview bus to which a selected audio channel is assigned may be changed by pressing the preview bus select button 242. Operation of the preview bus select button 242 will not effect the audio channel assignment to the mixer input module 200; rather, only the review by assignment of a selected audio channel will be changed. Any change of preview bus assignment will be indicated by the preview bus indicator display 240.

Figure 3B:
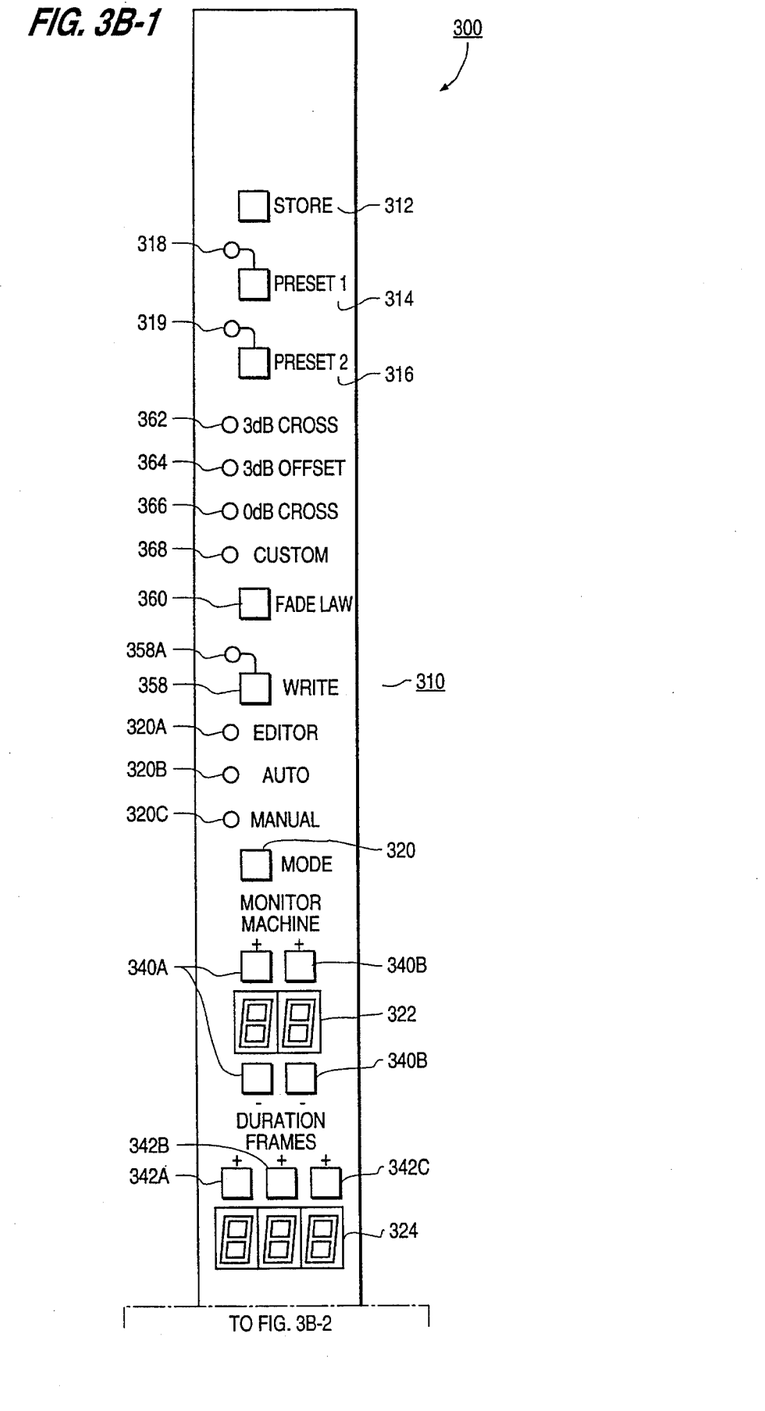
Figure 3B:
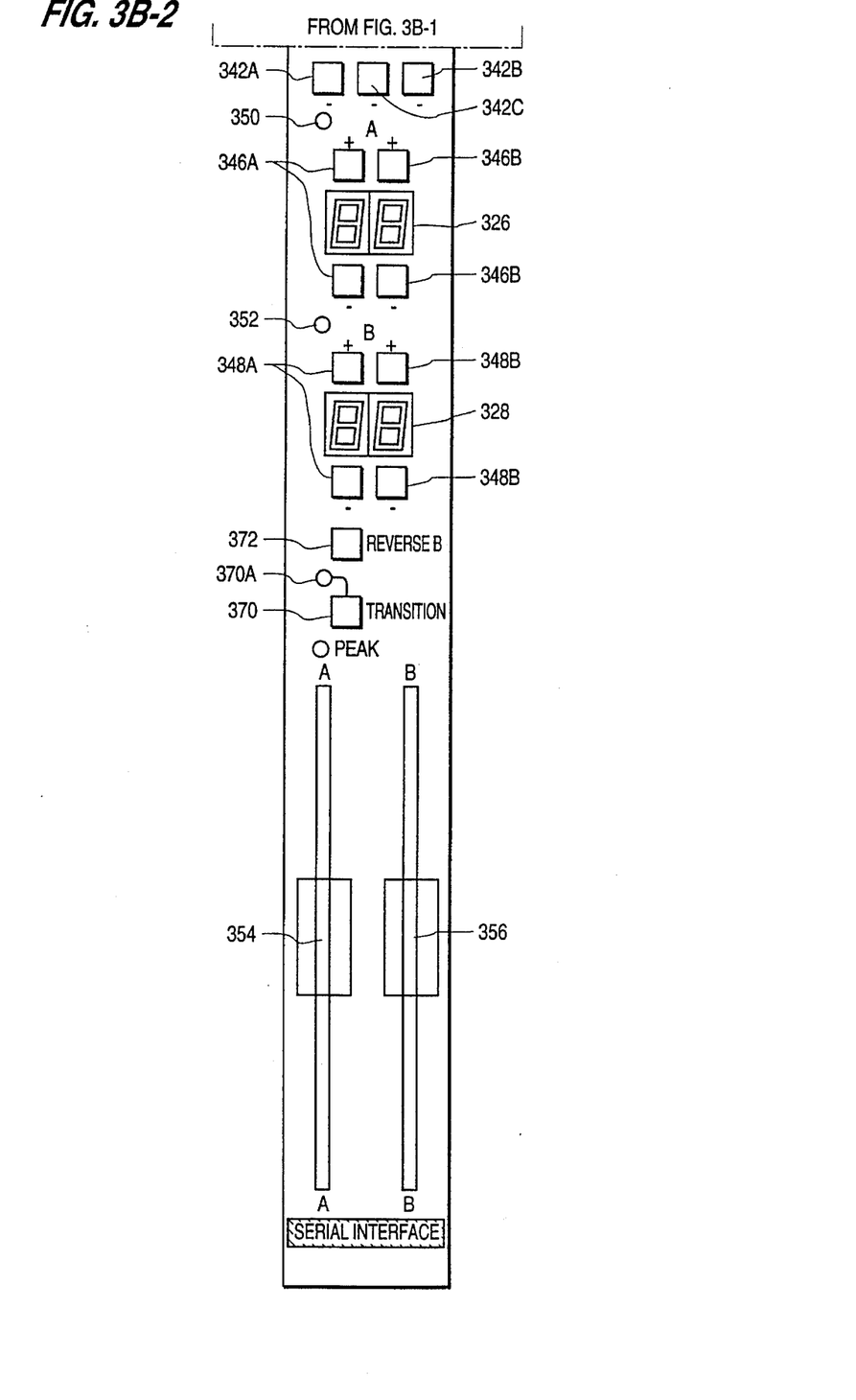

FIGS. 3B-1 and 3B-2 shows a serial interface module console 300. In this embodiment, several control switches and indicators are provided at a top portion 310 of the serial interface module console 300. These switches may be used to select various operating functions of the audio follow mixer system.

In this embodiment, selection of various configurations of the audio follow mixer system is facilitated by use a "store" function which allows a user to place a specific configuration in memory. As shown, the serial interface module console includes a store button 312 along with two preset buttons 314 and 316 labelled respectively PRESET 1 and PRESET 2. According to this example, once a specific arrangement of VTRs or other multichannel devices is selected by operation of the various input modules as described above, the configuration may be assigned to one of two memory locations. This is accomplished by depressing the store button 312 which thereby arms the store function, and then pressing either the preset 1 button 314 or the preset 2 button 316. The configuration information is then stored accordingly, for example, in one of two memory locations, which may be comprised of either volatile or nonvolatile memory. However, it should be understood that while two memory locations are used in this example, different numbers of memory locations may be used.

Each input module incorporated into the audio follow mixer system may be provided with an automatic identification means which provides a signal to the serial interface module through the mixer bus lines. These signals may indicate the type of input module and its location in the mixer console. For example, control signals provided by each input module would indicate whether it was a stereo-type, monaural-type, or dual-type module, and further indicate its preview bus, input machine, and audio channel assignment. The signals corresponding to the system configuration can then be stored for repeated use in a memory location.

For example, once a configuration is stored in either the preset 1 or the preset 2 memory locations, it can be recalled simply by depressing either the preset 1 button 314 or the preset 2 button 316. This operation resets the configuration by initiating control signals indicating VTR, audio channel, input select and preview bus assignments to be sent from the serial interface module to the input modules. The configuration that is currently in use will be indicated by preset indicator LEDs 318 and 319. That is, if the preset 1 button 314 is depressed, the audio follow mixer will be configured such that the VTR assignment, audio channel assignment and preview bus assignment of the input modules will be reset to a configuration stored in the preset 1 memory location; the preset 1 configuration will be indicated by illumination of the preset 1 indicator LED 318.

Further shown in this FIGURE is a mode select button 320 located on the control portion 310, and a plurality of mode indicator LEDs 320A, 320B, and 320C to visually indicate the operating mode of the audio follow mixer system. By pushing the mode select button 320, the operator may toggle through various operating modes. For example, the initial mode at power-up may be "EDITOR" mode. While in this mode, an EDITOR mode LED 320A will be illuminated. If the mode select button is then pushed, the mixer will change to an "AUTO" (local) mode, and the AUTO mode LED indicator 320B will be illuminated. If the mode select button is pushed again, the mode will be switched to a "MANUAL" mode, and the MANUAL mode LED indicator 320C will be illuminated. This cycle may be repeated by continuing to depress the mode select button 320. In this way, the mixer system can be operated under control of a video editor or operated locally.

The operation of the mixer is visually indicated by LED displays 322, 324, 326, and 328 which show respectively the number of the monitor machine, the duration of a crossfade, and the two machines "A" and "B" from which audio channels are provided for crossfading. While not in editor mode, the monitor machine, the transition duration, as well as the A and B machines may be selected by various control buttons located on the serial interface module console.

In this example, each seven segment display element has two depressible buttons associated with it, one to increase the number displayed, the other to decrease it. Thus, the dual seven segment LED monitor machine display 322 has two pairs of select buttons 340A and 340B by which the left and right display elements can be changed, respectively. Similarly, the triple seven segment LED duration frame display 324 has three pairs of select buttons 342A, 342B and 342C for selecting the number of frames for an edit.

Likewise, an A machine and a B machine may be selected with the select buttons 346A, 346B, 348A, 348B which are associated with dual seven segment LED displays 326 and 328, as shown. Two single LEDs 350 and 352 are associated respectively with the A machine display 326 and the B machine display 328. If either of these LEDs 350 or 352 are illuminated, it indicates that the audio channel associated with that machine A or B is active, and therefore that machine is to be a "FROM" machine. Conversely, if LED 350 or 352 is not illuminated, it indicates that an audio channel of the associated A or B machine is to become active, that is the associated audio channel will be faded in to full gain, and therefore the machine is to be a "TO" machine.

In MANUAL mode, an operator can manually perform a crossfade between a selected TO machine and a selected FROM machine. In this example, fader slide controls 354 and 356 are used to perform edits between a selected A channel and a selected B channel. When a fader slide control is at the top position, the designated audio channel is set to full gain and the associated machine is the FROM machine. However, if the fader slide control is at the bottom position, the designated channel is set to zero gain and is the TO machine. Gain of the appropriate channel is controlled by a plurality of voltage controlled amplifiers (VCAs) located in the mixer, as is known in the art.

For example, if the A fader slide control 354 is at the top position and the B fader slide control 356 is at the bottom position, then the crossfade will be performed from channel A to channel B, that is, between the FROM machine indicated by the A machine display 326 and the TO machine indicated by the B machine display 328. This status will be indicated by illumination of the LED 350 and non-illumination of the LED 352.

According to this embodiment of the invention, a user can store a particular crossfade performed in MANUAL mode by use of a WRITE button 358 and a FADE LAW button 360 located on control portion 310 of the serial interface module 300. This operation is performed by repeatedly depressing the FADE LAW button 360, thereby toggling through various types of crossfade curves selectable in AUTO mode until CUSTOM crossfade is indicated by an LED indicator 368 (LED indicators 362, 364, and 366 indicate selection of the other types of crossfade curves). Once set to CUSTOM mode, the WRITE button 358 is enabled. Depressing the WRITE button then causes a subsequent crossfade performed by operation of the fader slide controllers 354 and 356 to be stored in memory. The storage of the crossfade will start once the fader slide controllers 354 and 356 are changed from the top or bottom. When the fader slide controllers 354 and 356 have reached their full transition, storage of the crossfade will cease.

MANUAL mode operation is further facilitated by use of a REVERSE select button 372. Depressing this button reverses the top and bottom positions of the B machine crossfader. That is, if the REVERSE select button 372 is depressed, if set to the top position, the fader slide controller 356 causes the B channel to be set to zero gain while in the bottom position, the fader slide controller 356 causes the B channel to set to full gain.

Once a custom crossfade has been stored, it can be used while the mixer is in AUTO mode or in EDITOR mode. For example, once placed in AUTO mode by appropriate operation of MODE select button 320, an operator can then select CUSTOM mode using the FADE LAW button 360 as above. The operator then selects the A machine and B machines which, when the mixer is in AUTO mode, indicate respectively the TO and FROM machines. The stored crossfade may then be performed by depressing a TRANSITION button 370 which then causes the stored crossfade to be initiated between the selected machines. In EDITOR mode, the transition may be initiated by an editor command from the video editor to the serial editor interface.

Figure 4A:
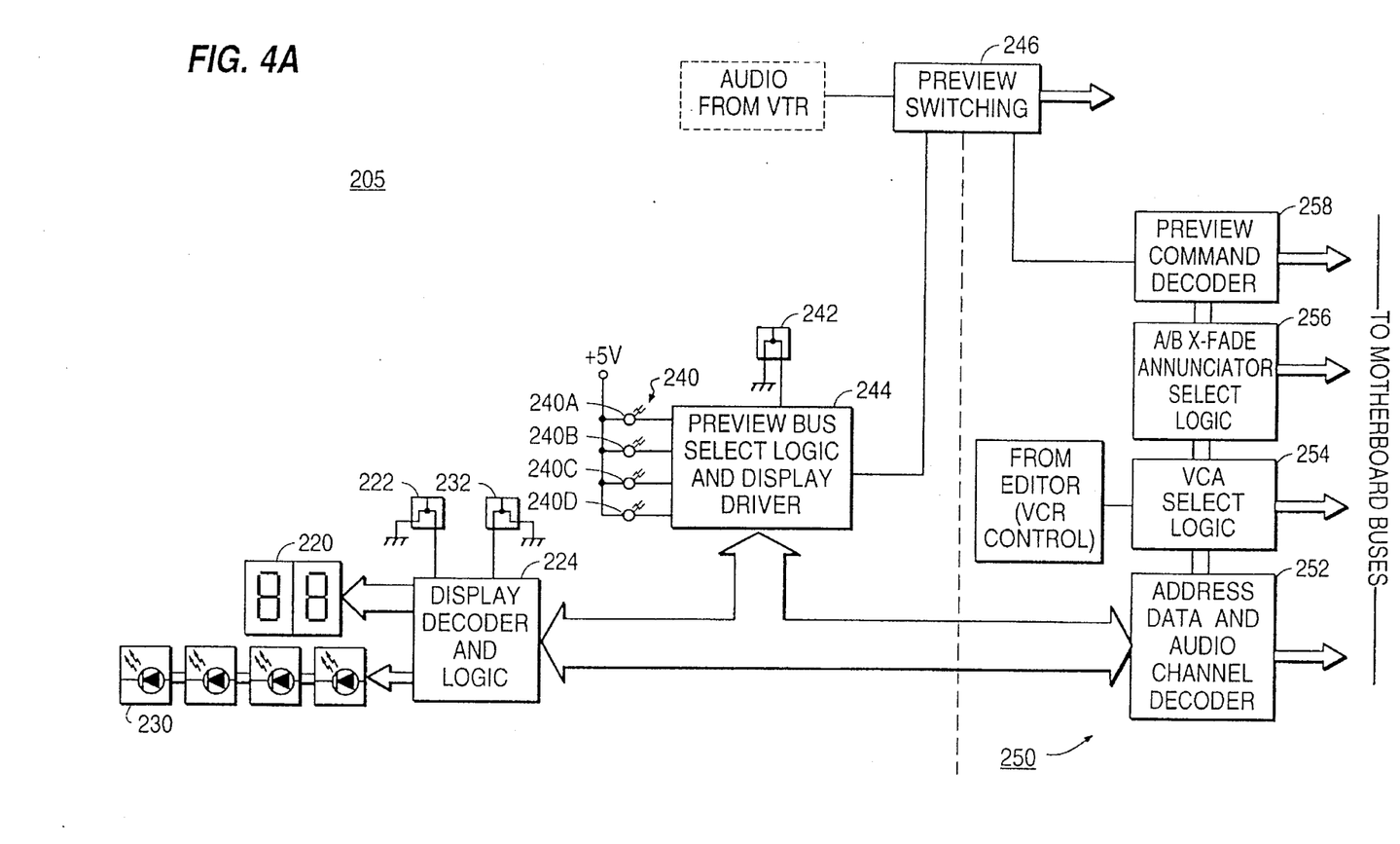
FIGS. 4A and 4B show respectively circuit configurations for implementing the input module of FIG. 3A and the serial interface module of FIG. 3B.
Figure 4B:
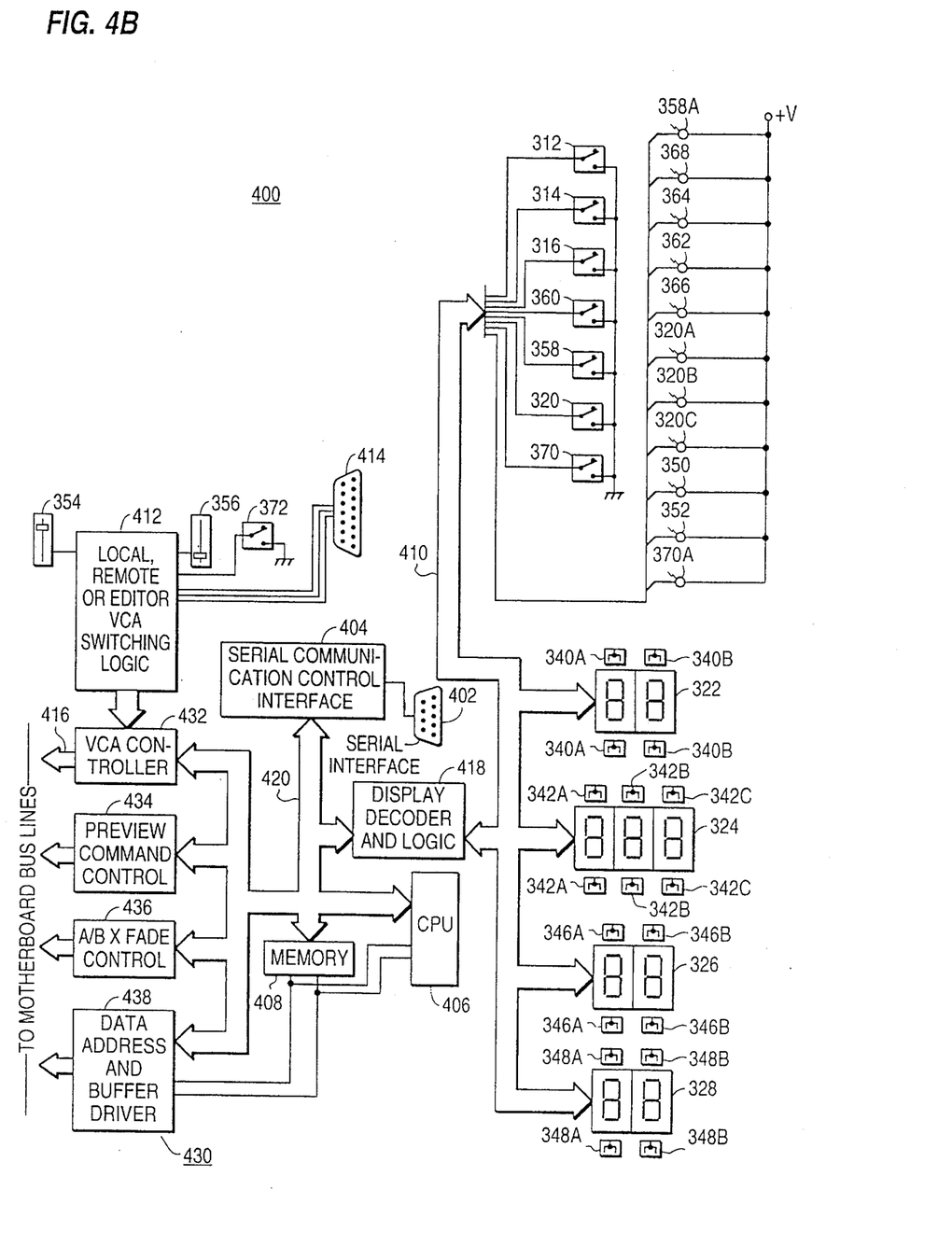

FIGS. 4A and 4B illustrate a circuit configuration which may be used to implement the embodiment described in reference to FIGS. 3A and 3B. In FIG. 4A, a machine select button is shown at reference numeral 222, which is used to select the VTR assigned to the mixer input module. When the machine select button 222 is depressed, the display decoder and logic circuit 224 detects. this operation and sends out control signals to the dual seven segment LED display 220, which displays the number of the selected VTR as discussed above. Control signals are also sent from this circuit to buses located on the mother board of the audio follow video mixer via several control circuits 250 (i.e., the illustrated circuits 252, 254, 256 and 258). In this way, signals supplied by a VTR connected to the line input of the input module are available for processing by the audio follow video mixer. The configuration display provides the operator with visual confirmation that the correct VTR has been selected.

Similarly, the operator may select the audio channel for the input module by depressing the channel select button 232. This operation causes the display decoder and logic circuit to send signals that illuminate the appropriate bar segment of LED 230. As with the VTR configuration selection, signals indicating the selected audio channel are provided to buses on the mixer mother board via control circuits 250.

The display decoder and logic circuit 224 is also coupled to a preview bus select logic and display driver circuit 244. This circuit drives the appropriate LED indicator 240A, 240B, 240C or 240D, to provide a visual indication of which preview bus is available to the selected audio channel. A preview bus assignment may be changed by depressing the preview bus select switch 242. This operation toggles the preview bus LED indicators and initiates control signals to be sent via the preview bus select logic and display driver circuit 244 to make available the desired preview bus. These control signals are input to a preview switching circuit 246, which routes the audio channel signals from the input VTR accordingly.

The control circuits located on the mixer input module couple the display decoder and logic circuit 224 and the preview bus select and display driver circuit 244 with the various buses located on the motherboard of the mixer. As shown, these control circuits include an address, data, and audio channel decoder circuit 252, a VCA select logic circuit 254, an A/B cross fade annunciator select logic circuit 256 and a preview command decoder circuit 258. These circuits 250 control the processing of the selected audio channel associated with the VTR coupled to the module.

FIG. 4B is a representation of a serial interface circuit 400 according to an embodiment of the invention. In this circuit, serial communication with a video editor is provided by use of a 9-pin connector 402 coupled to a serial communication interface circuit 404. This provides an interface between the audio follow video mixer and a video editor by which the above-described control signals can be uploaded and downloaded. For example, through this interface, the video editor can indicate that a custom crossfade stored in memory is to be performed.

The serial interface circuit of this embodiment further includes a central processing unit (CPU) 406 and a memory means 408. The memory provides control signals to the CPU 406 and further contains locations in which preset configurations and custom crossfades may be stored. The various indicators and displays, as discussed with reference to FIG. 3B, are shown in FIG. 4B. These indicators and displays are displayed under control of a display decoder and logic circuit 418 via lines 410, as shown.

Furthermore, a VCA switching logic circuit controls the operation of various VCAs associated with selected A and B channels via a VCA control circuit coupling the serial interface module with the VCA bus lines. The VCA switching logic circuit is operatively coupled to the fader slide controllers 354 and 356 and the REVERSE control button, as shown. Operation of the fader slide controllers 354 and 356 may control operation of various VCAs coupled to the VCA bus lines according to a technique well known in the art.

The display decoder and logic circuit 418 is provided to control the operation of the monitor machine display 322, the duration frame display 324, A machine display 326, and B machine display 328, as well as operation of the control buttons 330 340A, 340B, 342A, 342B, 342C, 346A, 346B, 348A and 348B that control the functions corresponding to these displays, as described above. The display decoder and logic circuit is further coupled to the MODE select button 320, FADE LAW button 360, WRITE button 358, and TRANSITION button 370 and the various LED indicators 358A, 368, 364, 362, 366, 320A, 320B, 320C, 350, 352 and 370A located on the serial interface module console as described above.

Controlled by the CPU 406, these elements are coupled along bus lines in the serial interface module to various control circuits which are further coupled to the buses located on the motherboard of the audio follow video mixer. Besides the above-described VCA control circuit 432, these control circuits include a preview command control circuit 434, an A/B crossfade control circuit 436, and a data address and buffer driver circuit 438. These control circuits provide means for controlling various operations of the audio channels provided to the mixer system according to control signals received from a video editor, or provided locally from the control portion 310 of the serial interface module console.

For example, operation of the MODE select button 320, FADE LAW button 360, WRITE button 358, and TRANSITION button 370 each causes an appropriate signal to be sent via display decoder and logic circuit 418 to the CPU 406. In turn the CPU 406 initiates the appropriate operation and display indication. More particularly, if set in CUSTOM and MANUAL modes, depression of the WRITE button 358 causes the particular digital control data which controls the appropriate VCAs located in the mixer to be saved in memory 408.

According to this embodiment of the invention, it is possible for an operator to achieve a custom crossfade and then save it for future use. This allows the operator to experiment with various different crossfades and conserve production time by having a desired custom curve stored.

From the foregoing description, one skilled in the art can easily ascertain the essential characteristics of this invention, and without departing from the spirit and scope thereof, can make various changes and modifications of the invention to adapt it to various usages and conditions. For example, the functions of the STORE and WRITE buttons described in the preferred embodiment could be combined according to techniques known in the art. Accordingly, the invention is only limited by the claims set forth herein.

What is claimed is:

1. An audio follow video mixer for performing a crossfade operation between a first audio channel having a first amplitude and a second audio channel having a second amplitude comprising:

gain control means for adjusting the amplitudes of the first audio channel and the second audio channel, said gain control means including means for manually controlling the adjustment of the amplitude of the first audio channel and the second audio channel and means for providing signals indicating the adjustment made to the first audio channel and the second audio channel;

processor means for receiving said adjustment indicating signals;

memory means for storing data corresponding to said adjustment indicating signals;

a first control member provided on a display portion of said audio follow video mixer, said member being operable to provide a store signal to said processor means to cause said processor means to provide said data corresponding to said adjustment indicating signals to said memory means; and a second control member provided on said display portion operable to cause said processor means to control said gain control means to adjust the amplitudes of the first audio channel and the second audio channel in accordance with said data stored in the memory means;

wherein said first control means and said second control means together comprise a write control member and at least one recall control member, wherein said write control member is operable to arm said processor means to provide said data to said memory means upon operation of said at least one recall control member, and said recall control member is otherwise operable independent of said write control member to cause said processor means to provide said data to said memory means.

2. The apparatus according to claim 1 further including a LED indicator for visually indicating that the first control member has enabled the storing of said data.

3. A module for an audio follow video mixer, said audio follow mixer processing a first audio channel having a first amplitude and a second audio channel having a second amplitude, comprising:

gain control means for adjusting the amplitudes of the first audio channel and the second audio channel, said gain control means including means for manually controlling the adjustment of the amplitude of the first audio channel and the second audio channel and means for providing signals indicating the adjustment made to the first audio channel and the second audio channel;

processor means for receiving said adjustment indicating signals;

memory means for storing data corresponding to said adjustment indicating signals;

a first control member provided on a display portion of said module, said member being operable to provide a store signal to said processor means to cause said processor means to provide said data corresponding to said adjustment indicating signals to said memory means;

a second control member provided on said display portion operable to cause said processor means to control said gain control means to adjust the amplitudes of the first audio channel and the second audio channel in accordance with said data stored in the memory means; and interface means for operatively coupling said processor means with a video editor;

wherein said first control means and said second control means together comprise a write control member and at least one recall control member, wherein said write control member is operable to arm said processor means to provide said data to said memory means upon operation of said at least one recall control member, and said recall control member is otherwise operable independent of said write control member to cause said processor means to provide said data to said memory means.

4. The module according to claim 3 wherein said manual adjustment control means includes a third member and a fourth member each respectively coupled to gain control circuit means which control the amplitude of the first and second audio channels.

5. The module according to claim 3 further including visual display means associated with said first control member and said second control member for providing visual indications that said data corresponding to said adjustment indicating signals are being stored in said memory means and that said gain control means is adjusting the amplitudes of the first audio channel and the second audio channel in accordance with said data stored in the memory means.

6. The module according to claim 3 wherein said video editor provides signals to said processor means causing said processor means to control said gain control means to adjust the amplitudes of the first audio channel and the second audio channel in accordance with said data stored in the memory means.

7. An audio crossfade control apparatus comprising:

an audio follow video mixer console;

a gain control circuit provided in said mixer console for adjusting the respective amplitudes of a first output audio channel and a second output audio channel;

a first manual adjustment member and a second manual adjustment member disposed on said mixer console and providing respective gain control signals to said gain control circuit to cause said gain control circuit to adjust said amplitudes of said first output audio channel and said second output audio channel;

memory means provided in said mixer console for storing data;

processor means operatively coupled to said gain control circuit, said memory means, said first manual adjustment member and said second manual adjustment member, said processor means providing data to said memory means which corresponds to said gain control signals;

store control means provided on said mixer console operable to generate a store signal which is input to said processor means, said store signal causing said processor means to provide said data to said memory means; and recall control means provided on said mixer console operable to generate a recall signal which is input to said processor means, said recall signal causing said processor means to read said data from said memory means and to provide gain control signals to said gain control circuit based on said data from said memory means;

wherein said store control means and said recall control means together comprise a write control member and at least one recall control member, wherein said write control member is operable to arm said processor means to provide said data to said memory means upon operation of said at least one recall control member, and said recall control member is otherwise operable independent of said write control member to cause said processor means to provide said data to said memory means.

8. The apparatus of claim 7 further comprising interface means for operatively coupling said processor means within said mixer console with a video editor, said video editor being operable to generate a second recall signal remotely causing said processor means to read said data from said memory means and to provide gain control signals to said gain control circuit based on said data from said memory means.

9. The apparatus of claim 7 wherein said store control means comprises a plurality of control members which enable more than one set of data indicative of the amplitude adjustment of said first audio channel and said second audio channel to be stored in different locations in said memory.

10. The apparatus of claim 7 wherein said at least one recall control member comprises two recall control members, each controlling the storage and recall of data in different locations in said memory means.

11. The apparatus of claim 7 further comprising a plurality of light emitting diodes, each associated with said write control member and said at least one recall control member to indicate the respective operations thereof.

* * * * *